United States Patent
Furford

[15] 3,672,140
[45] June 27, 1972

[54] CRANBERRY HARVESTING APPARATUS

[72] Inventor: Julius M. Furford, Route 1, P.O. Box 442, Grayland, Wash. 98547

[22] Filed: July 9, 1970

[21] Appl. No.: 53,425

[52] U.S. Cl. ............................................. 56/330, 56/11.8
[51] Int. Cl. ..................................................... A01d 45/08
[58] Field of Search ................. 56/330, 11.2, 11.3, 11.8, 192, 56/14.4; 180/6.2

[56] References Cited

UNITED STATES PATENTS

| | | | |
|---|---|---|---|
| 1,368,795 | 2/1921 | Groce | 180/6.2 |
| 2,524,631 | 10/1950 | Minutillo | 56/330 |
| 2,192,468 | 3/1940 | Gore | 56/11.3 |
| 2,554,195 | 5/1951 | Jones | 56/14.4 X |
| 1,270,480 | 6/1918 | McCloskey | 180/6.2 X |
| 2,677,225 | 5/1954 | Ommodt | 56/192 X |

Primary Examiner—Louis G. Mancene
Assistant Examiner—J. N. Eskovitz
Attorney—Graybeal, Cole & Barnard

[57] ABSTRACT

A self-propelled vehicle having a pair of driven front wheels and a single free rotating pivotal rear wheel mounted on a generally triangular chassis. A motor mounted on the chassis adapted to drive the front wheels and a cranberry harvesting reel mounted on the front portion of the chassis. Separate drive trains running from the motor to each wheel, each drive train including a two-way clutch such that each wheel may be driven forwardly, rearwardly or completely disengaged from the motor for free rotation. An operator's platform mounted on the chassis adjacent control means for the two-way clutches.

11 Claims, 3 Drawing Figures

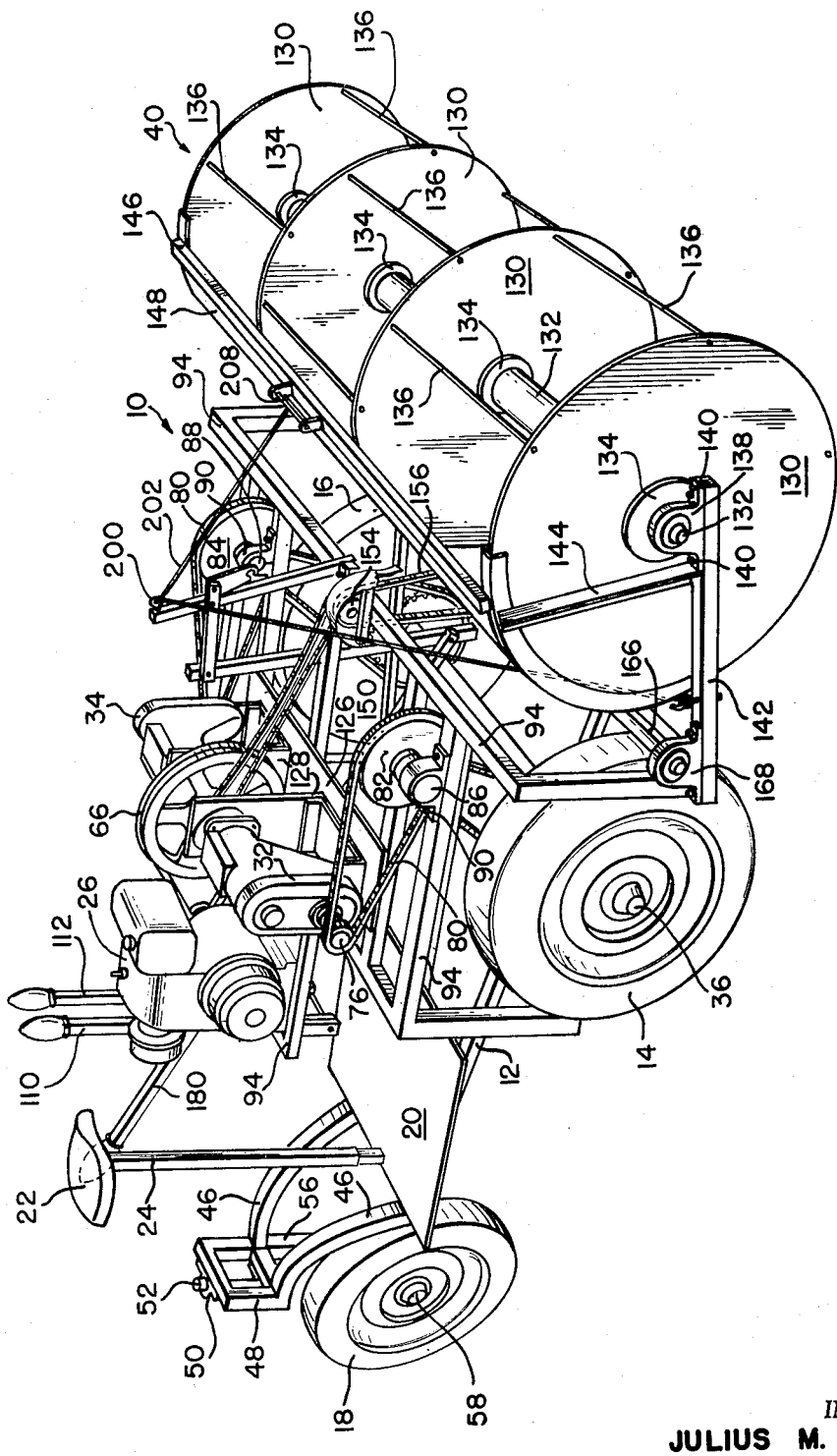

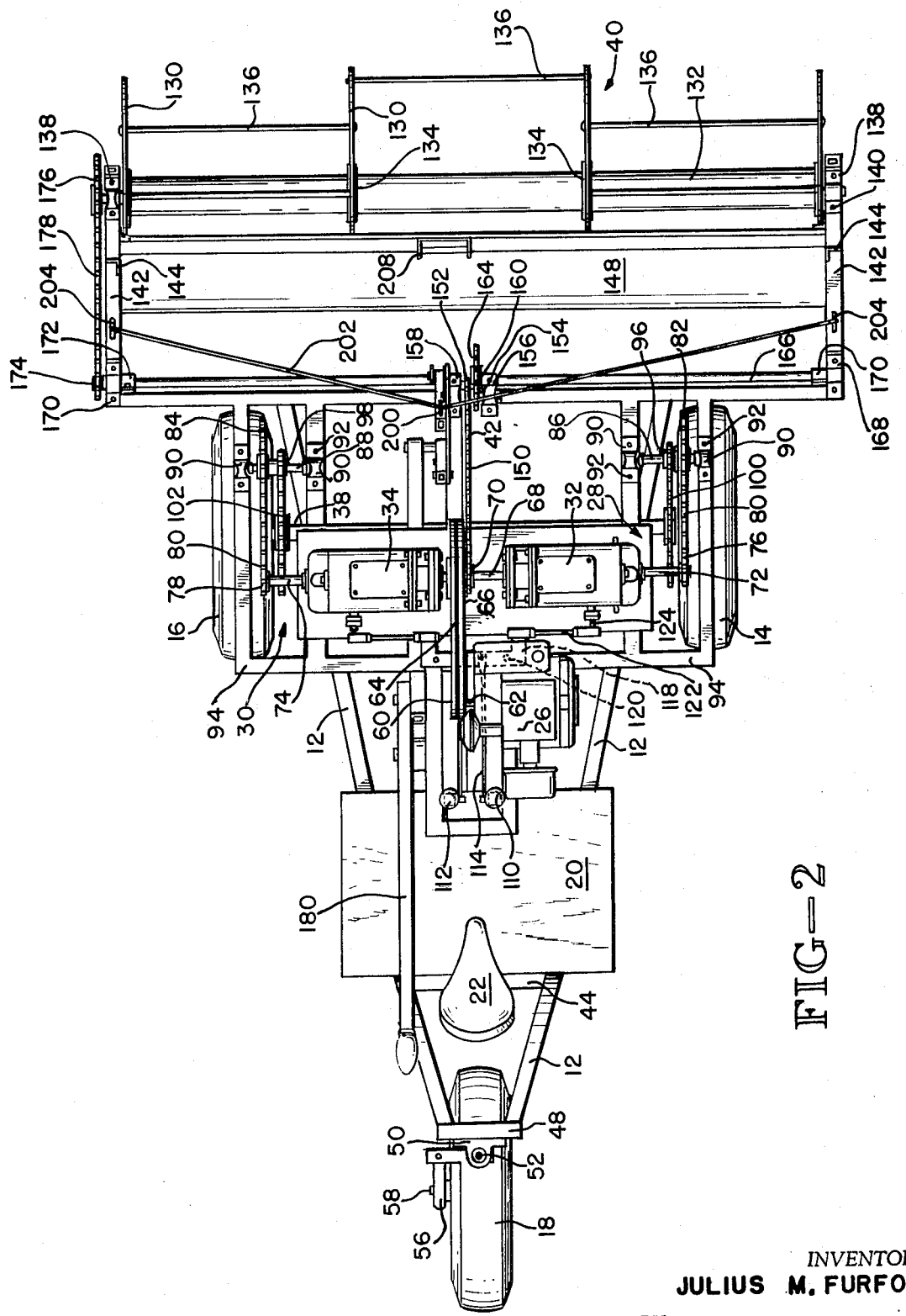

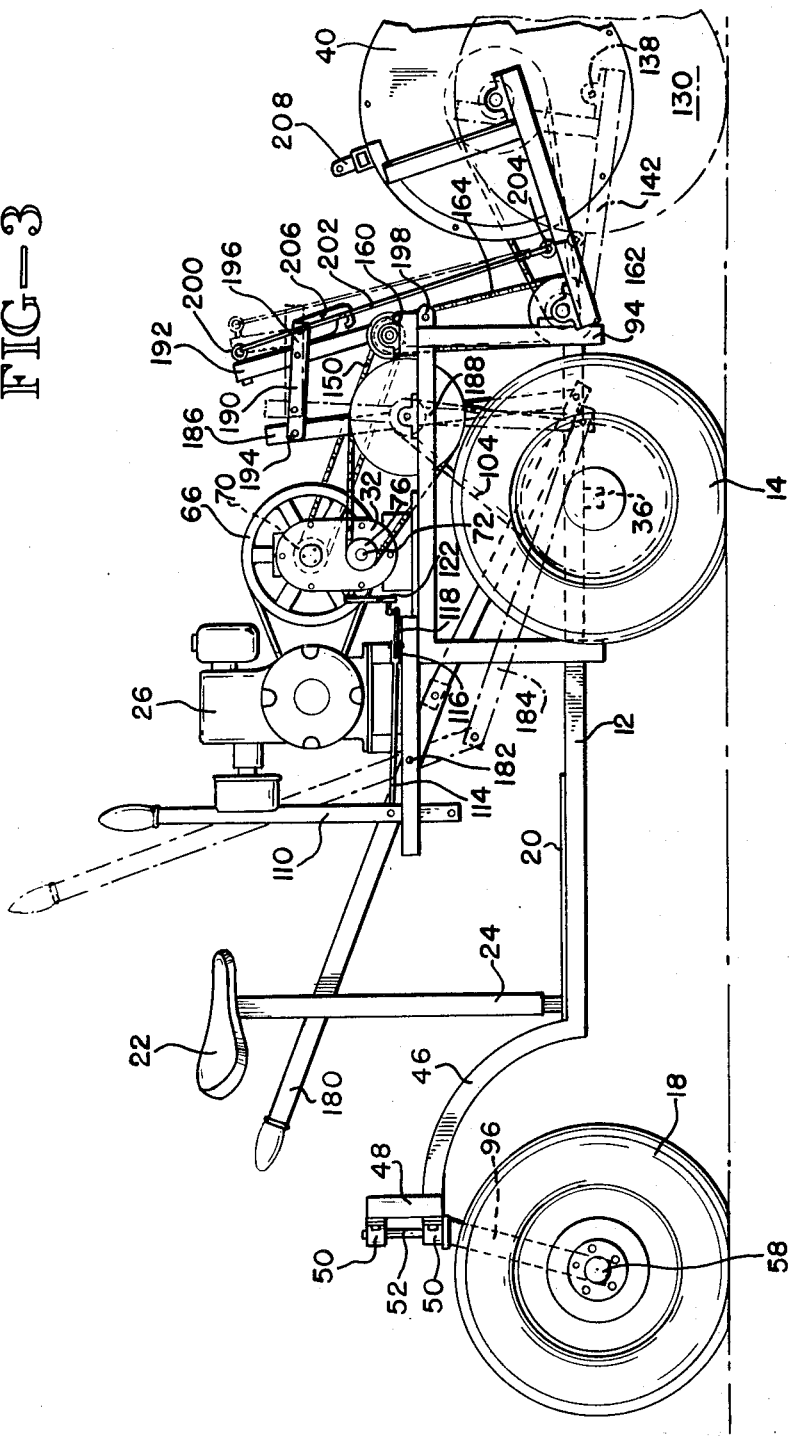

CRANBERRY HARVESTING APPARATUS

BACKGROUND OF THE INVENTION

1. Field of the Invention

The present invention relates, in general, to wet bog cranberry harvesting apparatus, and in particular, to a self-propelled operator carrying vehicle having a unique drive and steering system particularly suited for use in flooded cranberry bogs.

2. Description of the Prior Art

Cranberries are grown in bogs having relatively flat bottom surfaces surrounded by dikes. During harvesting, these bogs may be flooded with between 4 inches and 4 feet of water to facilitate picking. The cranberry vines are rooted in the bottom of the bog and generally form a tangle above and below the surface of the standing water. The cranberries themselves are both above and below the standing water and are buoyant.

Cranberry vines are fragile, while the cranberries themselves adhere strongly to the vines. A conventional technique for harvesting the berries is to vigorously agitate the vines to separate the berries therefrom such that they float on the surface of the water in the bog where they may be easily collected, usually by corralling the berries against the banks of the bog with the aid of "boom sticks" and conveying them from the bog to a transport vehicle on the bank. The agitation of the cranberry vines to remove the berries should not be so severe as to damage the vines themselves.

One harvesting technique includes mounting a so-called "water reel" for rotation on a hand tractor and driving it through the bog such that the rotation of the water reel agitates the vines to separate the berries therefrom. This technique necessitates the operator's walking in the flooded bog behind the hand tractor to guide it. This is a tiring and relatively unpleasant task, particularly in deep water. Changing the direction of travel of this type hand tractor usually results in spinning at least one of the drive wheels on the bottom of the bog, or holding one of the drive wheels stationary on the bottom of the bog while the tractor is pivoted thereabout, thereby causing the bottom of the bog including the roots and stalks of the cranberry vines to be torn up.

BRIEF SUMMARY OF THE INVENTION

The present invention provides an operator carrying, water reel type, cranberry harvesting vehicle which is lightweight and thus may travel over the bottom of a cranberry bog without becoming mired in, or unduly deforming, the bottom of the bog. The vehicle includes a pair of drive wheels and a single free rotating trailing wheel. Separate drive trains are provided between the vehicle motor and the driving wheels to supply power to either or both of the wheels. A two-way clutch is provided in each separate drive train, which allows each wheel to be separately rotated in either a forward or reverse direction, or be completely disengaged from the motor for free rotation. The single rear wheel of the vehicle is mounted for free rotation and is castered such that it may pivot through 360°. Separate clutch control means are located adjacent the operator's platform on the vehicle and the speed and direction of the vehicle are controlled by the operator's manipulation of the clutch controls. An additional control allows the water reel mounted on the front of the vehicle to be raised or lowered during operation.

It is an object of the present invention, therefore, to provide a cranberry harvesting vehicle of a type suitable for use in flooded bogs.

Another object is to provide a vehicle having a drive and steering apparatus which minimizes damage to the vines.

Still another object is to provide a cranberry harvesting vehicle upon which the operator may ride.

One more object is to provide a cranberry harvesting vehicle adapted to carry and drive a rotating water reel.

A more specific object is to provide a vehicle having a pair of front drive wheels connected to a motor by separate drive trains, each drive train including a two-way clutch.

Other objects and advantages will be apparent from the following description taken in conjunction with the accompanying drawings.

BRIEF DESCRIPTION OF THE DRAWINGS

FIG. 1 is a perspective view of a typical cranberry harvesting apparatus made according to the present invention.

FIG. 2 is a top plan view of the cranberry harvesting apparatus of FIG. 1.

FIG. 3 is a partial side elevation view of the apparatus of FIG. 1, including the water reel shown in dotted line in the down position.

DETAILED DESCRIPTION OF THE INVENTION

Referring now to FIG. 1, a cranberry harvesting apparatus 10 made according to the present invention is disclosed. Apparatus 10 includes a generally triangular chassis 12 having a pair of front wheels 14 and 16 and a rear wheel 18. Operator's platform 20, including seat 22 mounted on upwardly extending support 24, is disposed rearwardly on chassis 12, while drive motor 26 is mounted forward of the operator's platform.

Referring also to FIGS. 2 and 3, it will be seen that motor 26 is adapted to drive wheel 14 through a drive train numbered generally 28, while wheel 16 is driven through a drive chain numbered generally 30. Drive trains 28 and 30 respectively include two-way clutch mechanisms 32 and 34 through which wheels 14 and 16 may be driven in either the forward or reverse direction, or disengaged from the motor 26 such that they rotate freely on the bearinged shaft 36 and 38 on which they are mounted. Water reel 40 is mounted forwardly on chassis 12 and is adapted to be rotated by motor 26 through a drive train numbered generally 42 (FIG. 2).

Operator's platform 20 may consist of a simple metal sheet welded or bolted to chassis 12. Seat support 24 is likewise welded or bolted to brace 44 extending between the converging side portions of the generally triangular chassis adjacent platform 20.

Chassis 12 includes upwardly curved rear portions 46 which converge to connect with rear wheel support frame 48. Rectangular support frame 48 includes bearings 50 through which pin 52 is disposed for free rotation. Pin 52 is fixedly connected to outwardly extending beam 54 which in turn is fixedly welded or bolted to downwardly depending shaft 56 having a conventional bearing and shaft wheel mount 58 on which tire 18 is mounted for free rotation. Wheel 18 pivots in response to the directional movement of front wheels 14 and 16.

As illustrated, motor 26 is a conventional gasoline powered internal combustion engine, although other equivalent power sources may be substituted therefor. Motor 26 includes a double V pulley 60 mounted on output shaft 62 which trains V belts 64. Belts 64 transfer the rotational movement of drive pulley 60 to double V belt driven pulley 66 which is fixedly mounted on shaft 68. Shaft 68 is connected at its opposite ends to two-way clutches 32 and 34. Sprocket 70 is additionally fixedly mounted on shaft 68 and acts as a takeoff for water reel drive train 42.

Two-way clutches 32 and 34 may be of the conventional disc or cone type, with the primary requirements being that output shafts 72 and 74 of the clutches may be rotatably driven in either direction or completely disengaged from the motor to allow wheels 14 and 16 to rotate freely, i.e. without being affected by any degree of drive or drag from the motor. A clutch of the type disclosed in Sherman, U.S. Pat. No. 2,734,605, has been found to be satisfactory for use on this apparatus, although it will be readily understood that other clutches functioning in a similar manner may be used with equal effect.

Shafts 72 and 74 respectively include sprockets 76 and 78 mounted on their outer ends. Cooperating chains 80 transmit rotational movement to sprockets 82 and 84 mounted on shafts 86 and 88 respectively, which are journaled for rotation in bearings 90. Bearings 90 are mounted by conventional means such as bolts 92 to upper portion 94 of chassis 12. Upper portion 94 defines a substantially rectangular support frame above the lower V shaped support bars on which motor 26 and portions of drive trains 28 and 30 are mounted.

Sprockets 96 and 98 are fixedly mounted on shafts 86 and 88 and rotatably drive sprockets 100 and 102 through chains 104. Sprockets 100 and 102 are mounted on shafts 36 and 38 on which wheels 14 and 16 are conventionally mounted.

Clutches 32 and 34 are controlled by the movement of levers 110 and 112 respectively, which levers are disposed adjacent operator's platform 20. Referring particularly to FIGS. 2 and 3, the linkage whereby clutch 32 is controlled will be described, it being understood that the linkage between lever 112 and clutch 34 is identic. Lever 110 is connected near its lower portion to substantially horizontal rod 114 which is connected by means of a clevis joint 116 to pivotal L-shaped member 118. Member 118 pivots about bearing mount 120 and is conventionally connected to one end of L-shaped member 122, which is, in turn, connected at its opposite end to rotatable member 124 extending outwardly from clutch 32. Rotation member 124 controls the movement of output shaft 72, including both its direction of rotation and whether it rotates at all.

When lever 110 is in the substantially vertical position illustrated in the drawings, clutch 32 is in the neutral position and that portion of drive train 28 following clutch 32 is disconnected from motor 26. Pivoting the upper portion of lever 110 towards an operator seated on seat 22, member 124 is rotated in a first direction which causes output shaft 72 to rotate such that wheel 14 is driven in one direction. Pivoting of the upper portion of lever 110 away from the operator rotates member 124 in a second direction opposite the first direction thereby adjusting clutch 32 such that output member 74 and wheel 14 rotate in a direction opposite that described above. Levers 110 and 112 operate independently of each other, and thus it will be readily understood that wheel 14 may be driven in the forward direction, for example, while wheel 16 is being driven in the reverse direction, or vise versa, to cause vehicle 10 to rotate in a circle having a diameter equal to the length of vehicle 10.

Referring particularly to FIG. 1, horizontal support 126 for clutches 32 and 34 is shown mounted on upper frame portion 94 of chassis 12. Vertical supports 128 are spaced on member 126 to position the clutches such that shaft 68 extends between them.

Water reel 40 comprises a plurality of circular discs 130 spaced on centrally disposed rotatable shaft 132. Reinforcing collars 134 and transverse support braces 136 hold discs 130 such that they extend radially outward from shaft 132. Shaft 132 is mounted for rotation in bearings 138 which are bolted by conventional nuts and bolts 140 to side piece 142 of the pivotal water reel support frame. The water reel support frame additionally includes generally vertical members 144, top support 146 and spray shield 148 which extends downwardly and rearwardly from top support 146 and has an arc approximately equal to one-fourth the circumference of discs 130.

As has been discussed in part above, water reel 40 is driven by motor 26 through drive train 42 taking off from sprocket 70 on shaft 68. Chain 150 connects driving sprocket 70 to driven sprocket 152 mounted on shaft 154. Shaft 154 is in turn mounted for rotation in bearings 156 and 158 mounted on frame portion 94. Sprocket 160 is coaxial with sprocket 152 on shaft 154 and is adapted to transmit rotation to lower sprocket 162 through chain 164. Sprocket 162 is fixedly mounted on shaft 166 which is adapted to rotate in bearings 168 and 170 disposed on side members 142 of the water reel support frame. Shaft 166 additionally extends through bearings 170 and 172 (FIG. 2) mounted on frame portion 94, such that water reel 40 may be pivoted therein to raise or lower the water reel as will be discussed more completely hereafter. Shaft 166 additionally includes sprocket 174 mounted near one end which is adapted to drive sprocket 176 mounted on the end of water reel shaft 132 through chain 178 interconnecting these sprockets. It will thus be seen, that rotation of sprocket 70 on shaft 68 causes water reel 40 to be rotated through drive train 42. Although not shown in the drawings, it is also contemplated that a clutch such as a model No. SP6-1" W/416 manufactured by the K-M CLUTCH CO. may be additionally mounted on shaft 68 to allow the flow of power through drive train 42 to be regulated.

Referring particularly to FIG. 3, the apparatus for raising or lowering water reel 40 is disclosed. Lever 180 is provided adjacent the operator's platform 20. Lever 180 is pivotal about pin 182 on support frame 94. Linkage rod 184 is pivotally connected at one end to the lower end of lever 180, while its other end is pivotally connected to linkage rod 186. Rod 186 is adapted to pivot about central pivot connection 188 on frame portion 94. Linkage rod 190 interconnects rod 186 and rod 192 by means of pivotal connections 194 and 196. Rod 192 is itself adapted to pivot about connection 198 with support frame portion 94. It will be readily understood that the pivotal connections between the linkage rods and between the linkage rods support frame portion 94 may be formed by any conventional means such as nuts and bolts, rivets, or cotter pins. When lever 80 is in the substantially upright position as shown in dotted line in FIG. 3, water reel 40 is lowered such that the water reel runs upon, or close to, the bottom of the bog. Pivoting lever 180 downwardly, as shown in FIG. 3, causes the interconnected linkage rods to move and pivot such that the top portion of member 192 is rotated in a counterclockwise direction about pivot 198. Screw eye 200 is conventionally bolted or welded to the top portion of rod 192 and is adapted to receive the central portion of cable 202 which runs between screw eyes 204 on side members 142 of the water reel support frame. Thus it will be seen that the pivotal movement of rod 192 causes water reel 40 to be raised as shown in FIG. 3. Partial pivoting of lever 180 allows water reel 40 to be held at any desired intermediate level above the bottom of the bog.

Hook 206 is pivotally mounted near one end of linkage rod 190, and is adapted to engage bracket 208 mounted on beam 146 of the water reel support frame, to hold the water reel at an extreme raised position. As disclosed, the water reel is pivoted upwardly by hand to a point where hook 206 engages bracket 208, but it is contemplated that obvious modifications of the linkage system attached to lever 180 would allow the water reel to be pivoted to the extreme raised position by actuation of lever 180.

In operation in a cranberry bog having between 4 and 25 inches of standing water, for example, a vehicle substantially as illustrated in the drawings may be used to harvest cranberries in the following manner. Hook 206 is unhooked from bracket 208 with lever 180 in the down position such that water reel 40 assumes substantially the position shown in solid line in FIG. 3. Clutches 32 and 34 are moved to the neutral position by manipulation of levers 110 and 112 and motor 26 is started. Levers 110 and 112 are then pivoted in the same direction such that clutches 32 and 34 transmit power to wheels 14 and 16 such that the vehicle moves into the cranberry bog. Once in the bog, lever 180 is pivoted to the substantially upright position to lower water reel 40 such that it rotates on the bottom of the bog. As the vehicle moves through the bog, water reel 40 agitates the cranberry vines causing the berries to be detached therefrom whereupon they float to the surface of the bog. When the vehicle 10 reaches a bank of the cranberry bog, one of the two-way clutches 32 or 34 is pivoted such that the associated drive wheel 14 of 16 rotates in the reverse direction thereby causing the vehicle to pivot about in a circle having a diameter equal to the length of the wheels. Reversing the direction of the vehicle by driving wheels 14 and 16 in opposite directions minimizes stress on the bottom of the bog and consequent damage to the cranberry vines, in that the vehicle does not pivot about a fixed wheel. The return trip across the bog is made on a line adjacent that previously traveled, and by repetitive trips across the bog the vehicle may be used to remove the cranberries from the vines throughout the bog.

While a cranberry harvesting water reel has been shown mounted on vehicle 10 in the accompanying drawings, it will be readily understood that other attachments such as a reel mower, a sickle bar, a rotary mower or a fertilizer spreader may also be mounted thereon with slight modification of drive train 42. These attachments enable the vehicle to be used for a variety of jobs related to the raising of cranberries.

It is also contemplated that means may be provided for adjusting the height of wheels 14, 16 or 18 with respect to chassis 12 to allow the vehicle to be used in cranberry bogs having water standing up to 4 feet in depth. Along this line it is contemplated that the wheels may be disposed at different heights with respect to chassis 12 to allow the operator's platform to be held in a substantially horizontal position while mowing the sloping sides of the banks of a cranberry bog.

The invention may be embodied in other specific forms without departing from the spirit or central characteristics thereof. The present embodiments are therefore to be considered in all respect as illustrative and not restrictive, the scope of the invention being indicated by the appended claims rather than by the foregoing description, and all changes which come within the meaning and range of equivalency of the claims are therefore to be embraced therein.

I claim:

1. A self-propelled cranberry harvesting apparatus comprising a generally triangular chassis having a pair of front wheels and a rear wheel; a motor mounted on said chassis, said motor adapted to selectively power said front wheels through a pair of drive trains, said drive trains each including a two-way clutch; an operator's platform mounted on said chassis; clutch control means adjacent said platform such that an operator mounted thereon may control said clutches to selectively transmit power from said motor to said front wheels to drive each of said wheels in a forward or rearward direction; a cranberry harvesting reel mounted on said chassis, said reel adapted to be powered by said motor, means on said chassis for adjusting the height of said reel with respect to the bottom of the cranberry bog on which said vehicle is driven, said reel comprising a plurality of circular discs mounted on a rotatable shaft, said discs being horizontally spaced and one of said discs being connected to its neighboring disc by only said shaft and a plurality of support braces, said support braces and said shaft being radially spaced thereby defining an open area bounded by said one disc, said neighboring disc, said shaft and a plurality of said support braces.

2. A self-propelled cranberry harvesting apparatus comprising a chassis; a pair of wheels mounted for rotation near the front of said chassis; a motor mounted on said chassis; a pair of drive trains interconnecting said motor and said wheels adapted to transmit power from said motor to rotate said wheels; a two-way clutch in each of said drive trains adapted to selectively alter or interrupt the transmission of power from said motor to each of said wheels to separately reverse the rotation of either or both of said wheels or disengage either of said wheels to allow it to rotate freely; a wheel mounted for rotation near the rear of said chassis; an operator's platform mounted on said chassis adjacent control means for said clutches; and a cranberry harvesting reel rotatably mounted near the front of said chassis, said reel comprising a plurality of circular discs mounted on a rotatable shaft, said discs being horizontally spaced and one of said discs being connected to its neighboring disc by only said shaft and a plurality of support braces, said support braces and said shaft being radially spaced thereby defining an open area bounded by said one disc, said neighboring disc, said shaft and a plurality of said support braces.

3. The self-propelled cranberry harvesting apparatus of claim 2 wherein said cranberry harvesting reel is rotatably driven through a drive train by said motor.

4. The self-propelled cranberry harvesting apparatus of claim 3 wherein said clutches may be actuated such that each of said front wheels may be driven simultaneously in either a forward or rearward direction independent of each other.

5. The self-propelled cranberry harvesting apparatus of claim 3 wherein said cranberry harvesting reel is driven by said motor such that it rotates faster than said front wheels.

6. The self-propelled cranberry harvesting apparatus of claim 3 wherein said drive train includes a clutch for controlling the rotation of said cranberry harvesting reel.

7. The self-propelled cranberry harvesting apparatus of claim 3 including holding means for holding said reel in a raised position during travel when said reel is not in use.

8. A self-propelled cranberry harvesting apparatus comprising a chassis having a pair of laterally spaced drive wheels mounted near one end and a circularly pivotal free rotating wheel mounted centrally near its opposite end; a drive motor and an operator's platform mounted on said chassis; a pair of drive trains extending from said motor to said drive wheels and adapted to transmit rotational power from said engine to said drive wheels; a two-way clutch in each of said pair of drive trains to selectively alter or interrupt the transmission of rotational power from said drive motor to said drive wheels such that both or only one of said drive wheels may be driven or such that said drive wheels may be simultaneously driven in opposite directions to cause said apparatus to reverse direction within a circle having a diameter equal to the length of said apparatus; control means for said two-way clutches positioned adjacent said operator's platform whereby an operator may control the direction of travel of said apparatus through a cranberry bog; a cranberry harvesting reel mounted for rotation on the front of said chassis, said reel adapted to be driven by said drive motor on said chassis, said reel comprising a plurality of circular discs mounted on a rotatable shaft, said discs being horizontally spaced and one of said discs being connected to its neighboring disc by only said shaft and a plurality of support braces, said support braces and said shaft being radially spaced thereby defining an open area bounded by said one disc, said neighboring disc, said shaft, and a plurality of said support braces.

9. The self-propelled cranberry harvesting apparatus of claim 8 including means mounted on said chassis for adjusting the height of said cranberry harvesting reel above the bottom of a cranberry bog on which said apparatus is driven.

10. The self-propelled cranberry harvesting apparatus of claim 9 wherein said means for adjusting the height of said cranberry harvesting reel above the bottom of a cranberry bog includes a control lever positioned adjacent said operator's platform to allow the height of said reel to be adjusted while said apparatus is in operation harvesting cranberries.

11. The self-propelled cranberry harvesting apparatus of claim 8 including a clutch between said drive motor and said cranberry harvesting reel adapted to control the rotation of said reel.

* * * * *